United States Patent
Kim (10) Patent No.: US 7,391,470 B2
(45) Date of Patent: Jun. 24, 2008

(54) APPARATUS AND METHOD FOR PROVIDING CAPTION INFORMATION

(75) Inventor: Kwang-won Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 500 days.

(21) Appl. No.: 10/890,224

(22) Filed: Jul. 14, 2004

(65) Prior Publication Data

US 2005/0012858 A1    Jan. 20, 2005

Related U.S. Application Data

(60) Provisional application No. 60/487,235, filed on Jul. 16, 2003.

(30) Foreign Application Priority Data

Jul. 15, 2003    (KR) .................. 10-2003-0048317

(51) Int. Cl.
*H04N 7/00* (2006.01)
*H04N 5/445* (2006.01)

(52) U.S. Cl. .................. 348/465; 348/468; 348/564
(58) Field of Classification Search .......... 348/465, 348/468, 564, 569, 553; 725/38, 137
See application file for complete search history.

(56) References Cited

U.S. PATENT DOCUMENTS

| | | | | |
|---|---|---|---|---|
| 5,315,386 A * | 5/1994 | Muramoto | .................. | 348/569 |
| 5,428,400 A * | 6/1995 | Landis et al. | ............... | 348/569 |
| 5,519,780 A * | 5/1996 | Woo et al. | ................... | 725/137 |
| 5,617,146 A * | 4/1997 | Duffield et al. | ............. | 348/460 |
| 5,708,475 A * | 1/1998 | Hayashi et al. | ............. | 348/468 |
| 5,914,719 A * | 6/1999 | Herz | .......................... | 345/418 |
| 5,959,687 A * | 9/1999 | Dinwiddie et al. | .......... | 348/564 |
| 5,982,448 A * | 11/1999 | Reyes | ......................... | 348/552 |
| 6,215,483 B1 * | 4/2001 | Zigmond | .................... | 725/112 |
| 6,266,094 B1 * | 7/2001 | Taylor, Jr. | ................... | 348/465 |
| 6,320,621 B1 * | 11/2001 | Fu | .............................. | 348/465 |
| 6,977,690 B2 * | 12/2005 | Gomikawa | .................. | 348/468 |
| 7,019,787 B2 * | 3/2006 | Park | .......................... | 348/468 |
| 7,268,823 B2 * | 9/2007 | Mitts et al. | ................... | 348/465 |
| 2002/0083453 A1 | 6/2002 | Menez | | |
| 2003/0121045 A1 * | 6/2003 | Cho | .......................... | 725/90 |
| 2003/0169366 A1 * | 9/2003 | Lenzi et al. | ................. | 348/461 |
| 2003/0197732 A1 * | 10/2003 | Gupta | ........................ | 345/764 |
| 2005/0162551 A1 * | 7/2005 | Baker | ......................... | 348/468 |

FOREIGN PATENT DOCUMENTS

| | | |
|---|---|---|
| JP | 11-133942 A | 5/1999 |
| JP | 11-252517 A | 9/1999 |
| KR | 2002-0070898 A | 9/2002 |
| KR | 2002-0076777 A | 10/2002 |

* cited by examiner

*Primary Examiner*—Victor R. Kostak
(74) *Attorney, Agent, or Firm*—Sughrue Mion, PLLC (57) ABSTRACT

An apparatus and method for providing caption information effectively provides information on the status of a caption service for a broadcast signal depending on a user's selection by checking the caption service status of the broadcast signal at a predetermined time interval and storing the caption service status information obtained through the check. The apparatus includes a caption information collecting unit for checking the status of a caption service for a broadcast signal at a predetermined time interval and collecting information on the caption service status, and a caption information processing unit for displaying the collected caption service status information on a display unit.

27 Claims, 5 Drawing Sheets

| Caption SERVICE | Arrival time | Caption content | SI language information |
|---|---|---|---|
| SERVICE 1 | 0 seconds | I am a Korean | English |
| SERVICE 2 | 30 seconds | 나는 한국인이야 | Korean |
| SERVICE 3 | 1 minute | Je suis Coreenne | French |
| SERVICE 4 | 2 minute | Sou de Corea | Spanish |
| SERVICE 5 | 10 minute | わたしは かんこく です | Japanese |
| SERVICE 6 | X | | X |

| Caption service | Arrival time | Caption content |
|---|---|---|
| CC1 | 0 seconds | I am a Korean |
| CC2 | 30 seconds | Je suis Coreenne |
| CC3 | 4 minutes | Sou de Corea |
| CC4 | X | |

| Caption SERVICE | Arrival time | Caption content | SI language information |
|---|---|---|---|
| SERVICE 1 | 0 seconds | I am a Korean | English |
| SERVICE 2 | 30 seconds | 나는 한국인이야 | Korean |
| SERVICE 3 | 1 minute | Je suis Coreenne | French |
| SERVICE 4 | 2 minute | Sou de Corea | Spanish |
| SERVICE 5 | 10 minute | わたしは かんこく です | Japanese |
| SERVICE 6 | X | | X |

APPARATUS AND METHOD FOR PROVIDING CAPTION INFORMATION

This application claims the priority of Korean Patent Application No. 10-2003-0048317 filed on Jul. 15, 2003 in the Korean Intellectual Property Office and U.S. Provisional Patent Application No. 60/487,235 filed on Jul. 16, 2003 in the United States Patent and Trademark Office, the disclosures of which are incorporated herein by reference.

BACKGROUND OF THE INVENTION

1. Field of the Invention

An apparatus and a method consistent with the present invention relates to providing caption information, and more particularly, to an apparatus and a method for providing caption information, which effectively provides a user with information on the status of a caption service, and which can be provided through a broadcast signal currently provided, by checking the caption service status of the broadcast signal at predetermined intervals of time, storing the caption service status information obtained through the check, and providing the stored caption service status information at a user's request.

2. Description of the Related Art

Generally, a caption broadcast system in a television broadcast includes an open caption system for displaying emergency news, announcements, etc. depending on a broadcast station's selection rather than at a user's selection by superimposing a caption signal on an active interval of a broadcast signal, and a closed caption system for displaying subtitles and the like depending on the user's selection by carrying the caption signal on a non-active interval (i.e., vertical blanking interval) of the broadcast signal and transmitting the resultant signal.

In the closed caption system, a predetermined caption signal is inserted into a predetermined position of a video signal (e.g., the 21st horizontal line).

When a television receives a video signal with such a caption signal, it detects the caption signal from the received video signal according to the user's selection, decodes the detected caption signal into character data, and generates a character signal corresponding to the character data, so that the character signal is displayed at a predetermined position on a video display unit, such as a television screen, together with the video signal input into the video display unit.

This caption broadcast is supported in different manners by analog and digital televisions according to the properties of a broadcast signal. That is, analog television supports four caption services CC1, CC2, CC3 and CC4, while digital television basically supports six additional caption modes SERVICE 1, SERVICE 2, SERVICE 3, SERVICE 4, SERVICE 5 and SERVICE 6 according to the digital broadcast signal received.

Figure 1A:
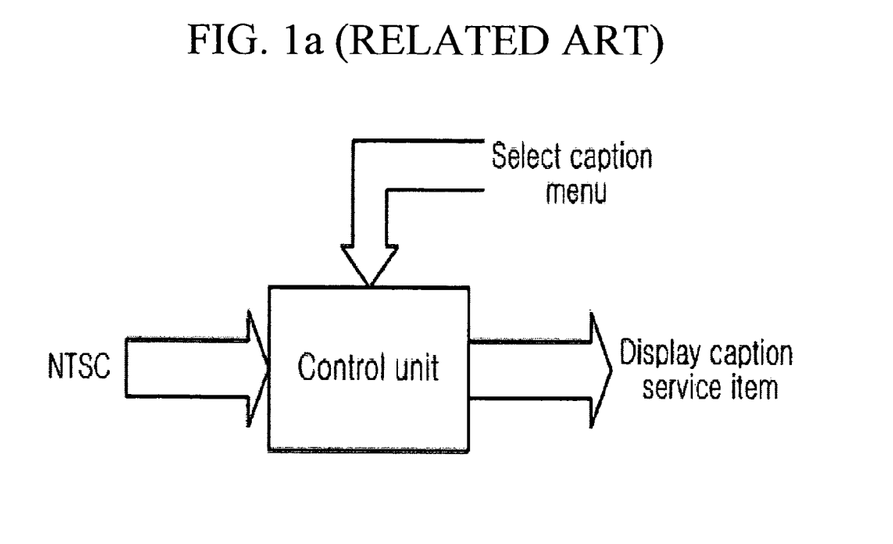
FIGS. 1a and 1b schematically show configurations for processing a caption in analog and digital televisions in the related art, respectively.

FIG. 1a schematically illustrates a configuration for processing a caption in an analog television in the related art.

As shown in FIG. 1a, in case of the configuration for processing the caption in the analog television, when a National Television System Committee (hereinafter, referred to as "NTSC") broadcast signal is received, a control unit outputs the received NTSC broadcast signal to be displayed on a television screen.

If a user selects a caption menu among from On Screen Display (hereinafter, referred to as "OSD") menus through a remote control or a key input unit, the control unit displays four supportable items of the caption services CC1, CC2, CC3 and CC4 on the television screen depending on the user's selection.

The user arbitrarily selects a specific caption mode from the caption modes displayed on the television screen, and in response to the user's selection, a microcomputer displays the caption signal, which is received through the relevant caption service according to the user's selection, on the television screen together with the broadcast signal.

Figure 1B:
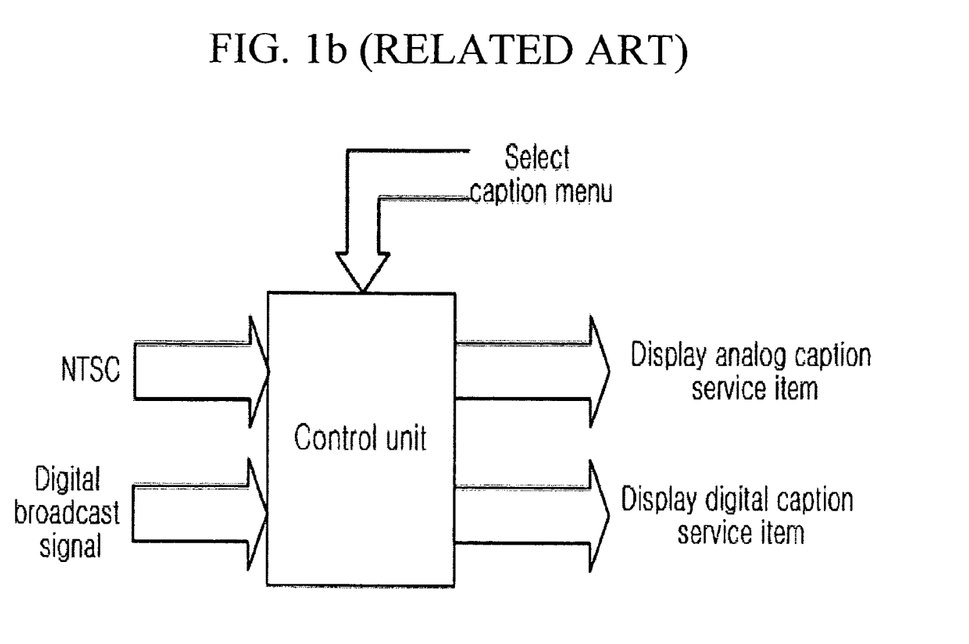

FIG. 1b schematically illustrates a configuration for processing a caption in a digital television in the related art.

As shown in FIG. 1b, in case of the configuration for processing the caption in the digital television, when NTSC and digital broadcast signals are input thereto, a control unit displays the NTSC broadcast signal on a television screen, or decodes the digital broadcast signal and display the decoded signal on the television screen, depending on the user's tuner selection.

If the user selects a caption menu among OSD menus during the display of the digital broadcast signal, a microcomputer displays items of the six caption modes SERVICE 1, SERVICE 2, SERVICE 3, SERVICE 4, SERVICE 5 and SERVICE 6 according to the user's selection of the caption menu.

The user arbitrarily selects a specific caption mode from the caption modes displayed on the television screen, and the microcomputer displays a caption signal on the television screen, which is received through a relevant caption service according to the user's selection, together with the broadcast signal.

Because the configurations for processing the caption in such analog and digital televisions having the aforementioned processes do not suggest whether caption service status information for each of the caption services is provided to the user as well as which caption information is provided, a user utilizing caption service status information may be required to select each caption service and then check the contents of a displayed caption.

To alleviate such inconvenience, a recent digital television provides caption service information, which is provided through a received broadcast signal, by referring to system information (SI) on the received broadcast signal. However, this is not helpful to the user because the caption service status information and the caption service information that are provided through each caption service are frequently mismatched.

For example, even though SERVICE 1 is being provided in English, there is a case where the service is displayed in French. This causes unnecessary confusion to the user.

Accordingly, there is a need for a method of allowing the user to correctly and conveniently confirm available caption service status information from a current broadcast signal.

SUMMARY OF THE INVENTION

While the present invention may solve the aforementioned problem, embodiments thereof are not required to solve this problem. An exemplary object of the present invention is to effectively provide information on the status of a caption service for a broadcast signal depending on the user's selection by checking the caption service status of the broadcast signal at a predetermined time interval and storing the caption service status information obtained through the check.

Further, another exemplary object of the present invention is to allow a user to correctly and conveniently confirm information on the status of an available caption service from an existing broadcast signal by displaying the caption service status information, such as signal arrival time and provided character information, according to each caption service.

In the present invention, a caption information-collecting unit checks the status of a caption service for a broadcast signal, which is input into a broadcast signal input unit, at a predetermined time interval and stores the collected information on the caption service status in a memory; and a caption service status information-processing unit provides a user with the caption service status information as an OSD menu in a predetermined layout structure according to a user's request.

The caption service status information includes a caption signal arrival time and caption content.

Further, the caption service status information further includes SI language information for each caption service, which is provided together with a broadcast signal.

Providing caption service information using a broadcast signal as described above can be roughly divided into a case where caption service information is provided to an analog television processing an analog broadcast signal, and a case where caption service information is provided to an analog/digital television processing analog and digital broadcast signals.

According to an aspect of the present invention for achieving the exemplary objects, there is provided an apparatus for providing caption information, comprising a caption information collecting unit for checking the status of a caption service for a broadcast signal at a predetermined time interval and collecting information on the caption service status; and a caption information processing unit for displaying the collected caption service status information on a display unit.

The caption information collecting unit may update caption service status information by storing the collected caption service status information in a memory unit. If power is on or a specific channel is selected by a user, the caption information collecting unit may collect caption service status information through a broadcast signal over the selected channel after deleting the caption service status information previously stored in the memory unit, and store the collected caption service status information in the memory unit.

The caption information processing unit may display the collected caption service status information as an on screen display (OSD) menu in a predetermined layout structure.

According to another aspect of the present invention, there is provided a method of providing caption information, comprising the steps of checking the status of a caption service for a broadcast signal at a predetermined time interval and collecting information on the caption service status; and if a user requests the collected caption service status information, displaying the collected caption service status information on a display unit.

The method may further comprise the step of updating caption service status information by storing the collected caption service status information in a memory unit. The step of collecting the caption service status information may comprise the steps of determining whether a caption signal for each caption service is received through the broadcast signal during a predetermined time period; if it is determined that a caption signal is received, checking caption signal arrival time, detecting a predetermined caption signal being received and collecting the caption signal arrival time and caption content; and if it is determined that a caption signal has not been received, recording the fact that a caption service is not provided in the relevant caption service.

BRIEF DESCRIPTION OF THE DRAWINGS

The above and other objects and features of the present invention will become apparent from the following description of illustrative, non-limiting embodiments given in conjunction with the accompanying drawings, in which.

DETAILED DESCRIPTION OF THE INVENTION

It will be understood by those skilled in the art that although the configuration and operation of an apparatus for providing caption information according to the present invention will be described in detail with reference to the accompanying drawings that illustrates a television as a representative example of a caption service device, various modifications and equivalents can be obtained by providing modules that enables a device other than a television, such as a set-top box or a video/DVD player, to provide caption service status information.

Accordingly, the true technical spirit and scope of the present invention should be defined by the appended claims.

Hereinafter, an apparatus and method for providing caption information according to illustrative embodiments of the present invention will be described in detail with reference to the accompanying drawings.

Figure 2:
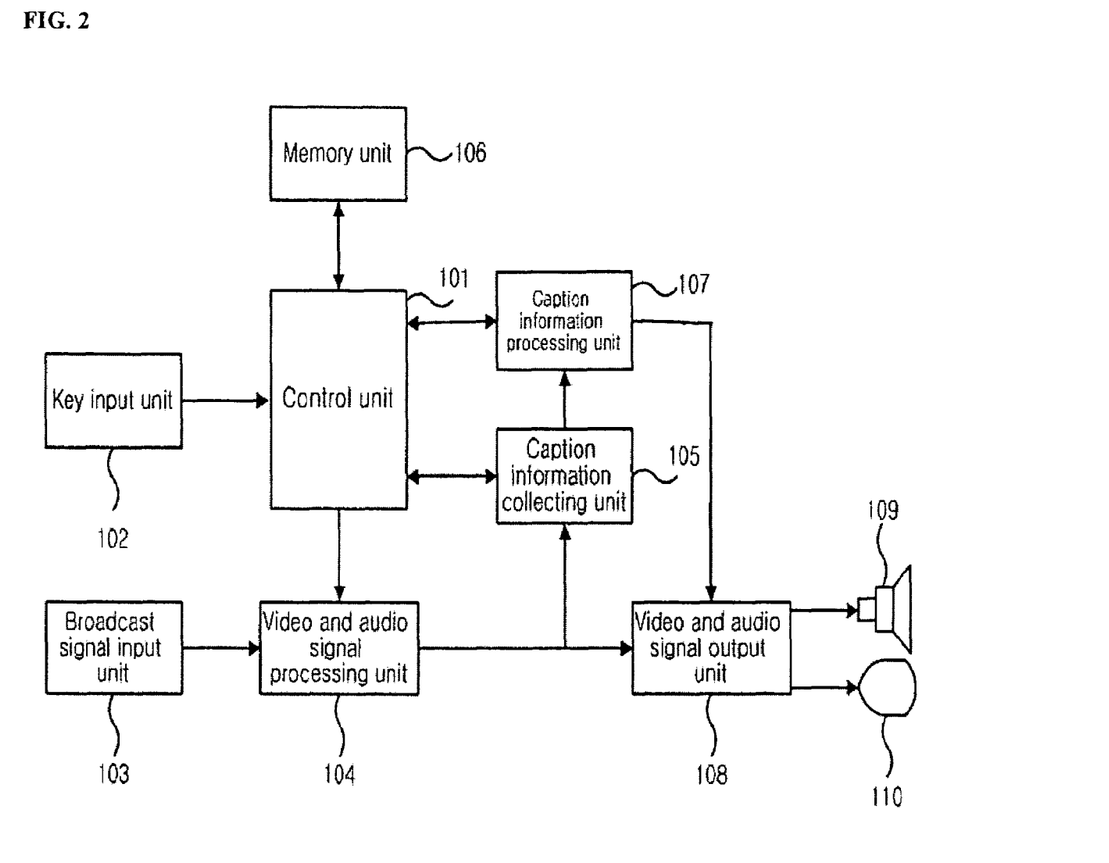
FIG. 2 schematically shows a configuration of an apparatus for providing caption information according to an illustrative embodiment of the present invention.

FIG. 2 schematically shows a configuration of an apparatus for providing caption information according to an illustrative embodiment of the present invention;

As shown in FIG. 2, the apparatus for providing caption information according to the present invention comprises a control unit 101, a key input unit 102, a broadcast signal input unit 103, a video and audio signal processing unit 104, a caption information collecting unit 105, a memory unit 106, a caption information processing unit 107, a video and audio signal output unit 108, a speaker 109 and a display unit 110.

The control unit 101 performs control of overall operations for providing a broadcast service and the caption information. Specifically, the control unit 101 checks and collects the status of a caption service, which is provided via the caption information collecting unit 105 together with a broadcast signal over a channel selected by a user, at a predetermined time interval, and stores the collected caption service status information in the memory unit 106. Further, the control unit 101 detects the stored caption service status information from the memory unit 106 and provides the detected information to the user via the caption information processing unit 107 depending on a user's request.

The key input unit 102 receives a user's key selection through a remote control or input keys, generates a control signal corresponding to the selection and sends the control signal to the control unit 101.

The broadcast signal input unit 103 receives a predetermined broadcast signal via a tuner that is adapted to output the broadcast signal, which is received over a broadcast channel selected by the user, among high frequency signals received by an antenna.

The video and audio signal processing unit 104 demodulates the broadcast signal output from the broadcast signal input unit 103 into audio and video signals, and processes and outputs the demodulated signals.

When power is on or a specific channel is selected by the user, the caption information collecting unit 105 checks the status of a caption service for the broadcast signal output from the broadcast signal input unit 103 at a predetermined time interval and collects given caption service status information.

The caption service status information includes caption signal arrival time, which is obtained in the process of checking whether a caption signal for each caption service provided together with a broadcast signal arrives during a predetermined time period, and caption content as a character signal, which is detected from a received caption signal and corresponds to a predetermined caption signal.

Additionally, in case of a digital television, the caption service status information further includes SI language information for each caption service, which is provided together with a digital broadcast signal.

As an example, in case of an analog television providing four caption services, the caption service status information includes caption signal arrival time for each of the caption services, and a character signal corresponding to each predetermined caption signal. In case of a digital television providing six caption services, the caption service status information includes caption signal arrival time, a character signal and SI language information for each of the caption services.

The memory unit 106 stores an algorithm for controlling the operation of the apparatus for providing the caption information, and data that are produced in the operation. Further, it stores the caption service status information obtained through the caption information collecting unit 105.

The caption information processing unit 107 displays the caption information detected from the memory unit 106 as an on screen display menu in a predetermined layout structure under control of the control unit 101, and processes a character signal, which corresponds to a caption signal received through a specific caption service selected by the user, so that the character signal can be output in a state where it is superimposed on a video signal according to a control code included in the caption signal.

The predetermined layout structure is composed of caption service status information for a plurality of caption services, which is adapted to provide the user with caption service status information in a structured manner. As an example of the layout structure, a table showing caption signal arrival time, caption content and SI language information for each of the caption services is used.

The video and audio signal output unit 108 outputs video and audio signals output from the video and audio signal processing unit 104 and the caption information processing unit 107 to the speaker 109 or the display unit 110 as a television screen.

For reference, in the apparatus for providing the caption information according to the illustrative embodiment of the present invention, all of respective modules of the apparatus may be constructed of hardware or software, or some of the modules may be constructed of software and some of the modules may be constructed of hardware.

Accordingly, it will be apparent that the construction of the apparatus for providing the caption information according to the illustrative embodiment of the present invention with hardware or software does not depart from the spirit of the present invention, and that modifications and changes may be added in constructing the apparatus with hardware and/or software without departing from the spirit of the present invention.

An illustrative network connection method according to the present invention using the apparatus for providing the caption information constructed as above will be described in detail with reference to the accompanying drawings.

Figure 3:
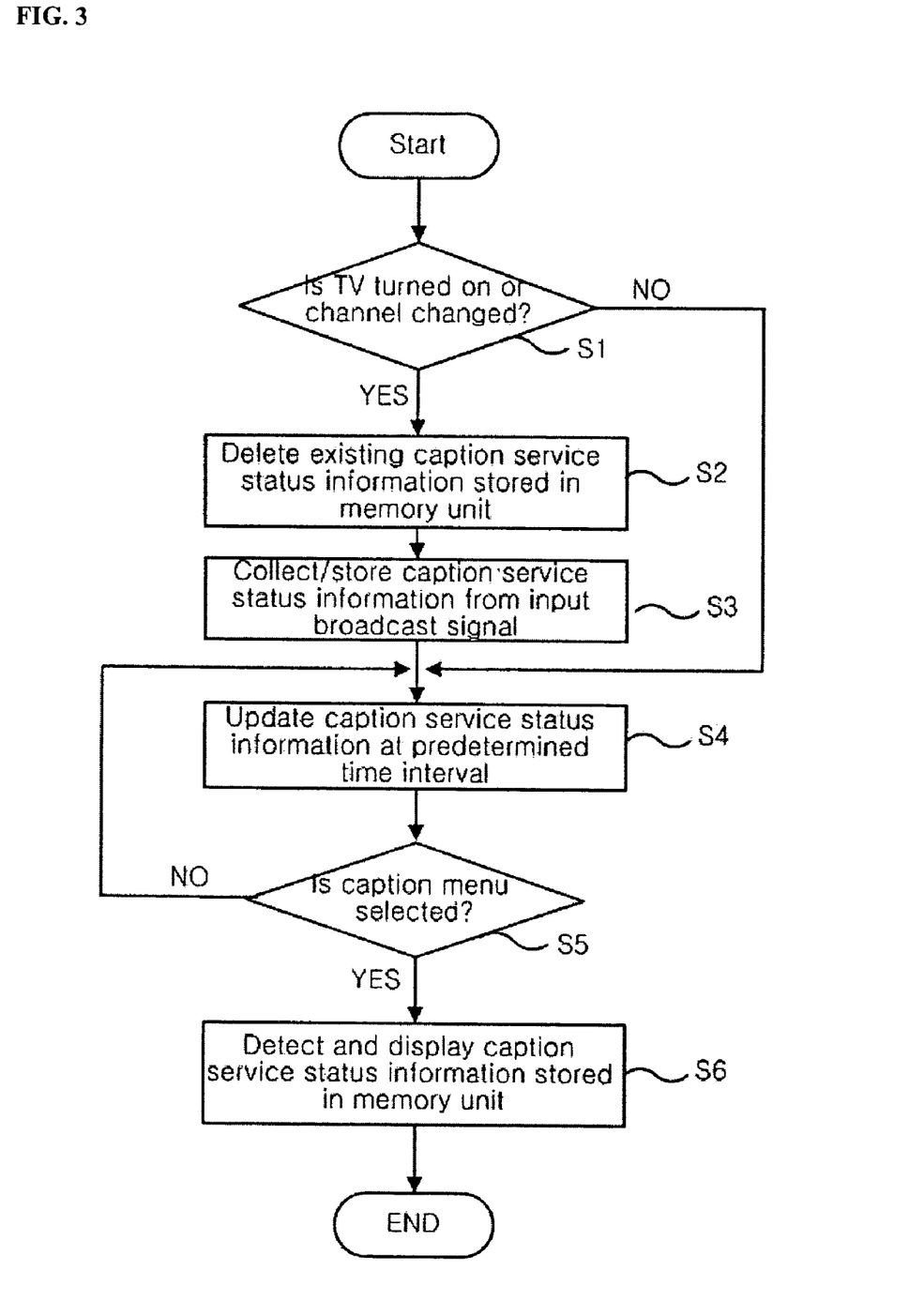
FIG. 3 schematically illustrates the process of providing caption information according to an illustrative embodiment of the present invention.

FIG. 3 schematically illustrates a process of providing caption service status information according to an illustrative embodiment of the present invention.

As shown in FIG. 3, the caption information collecting unit 105 determines whether a television is turned on due to application of electric power thereto or whether there is a change in channel due to the selection of a specific channel according to a user's key selection (SI).

If it is determined that the television is turned on or the channel is changed, existing caption service status information stored in the memory unit 106 is deleted (S2).

Subsequently, the status of a caption service for a broadcast signal input via the broadcast signal input unit 103 is checked at a predetermined time interval to collect predetermined caption service status information, and then, the collected caption service status information is stored in the memory unit (S3).

That is, it is checked whether a caption signal arrives during a predetermined time period with respect to each of the caption services through a broadcast signal over a previously tuned channel. If a caption signal arrives, the caption signal arrival time is checked and a predetermined caption signal is detected so that a corresponding character signal is generated.

Then, the caption service status information provided through the broadcast signal over the current channel at the predetermined time interval is collected to update the caption service status information stored in the memory unit 106 (S4).

If it is determined that the channel is not changed, the caption service status information provided through the broadcast signal over the current channel at the predetermined time interval is collected to update the caption service status information stored in the memory unit 106.

Through the aforementioned processes, the caption information collecting unit 105 continues to update the caption service status information for the existing broadcast signal, and the caption information processing unit 107 determines whether a user selects a caption menu of OSD menus by selecting keys (S5).

If it is determined that the caption menu is not selected, the process returns to the routine for updating the caption service status information. If it is determined that the caption menu is selected, the caption service status information stored in the memory unit 106 is displayed as an OSD menu in a predetermined layout structure (S6).

An apparatus and a method for providing the caption information according to the present invention will be described in detail by way of example with reference to the accompanying drawings.

The apparatus for providing the caption information according to the present invention performs a relevant procedure for processing caption service status information according to analog and digital broadcast signals input through an analog/digital television in order to provide caption service status information.

Thus, explanation will be first made as to the process of providing caption service information in an analog television processing an analog broadcast signal, and the process of providing caption service information in an analog/digital television processing analog and digital broadcast signals will be then explained.

Figure 4:
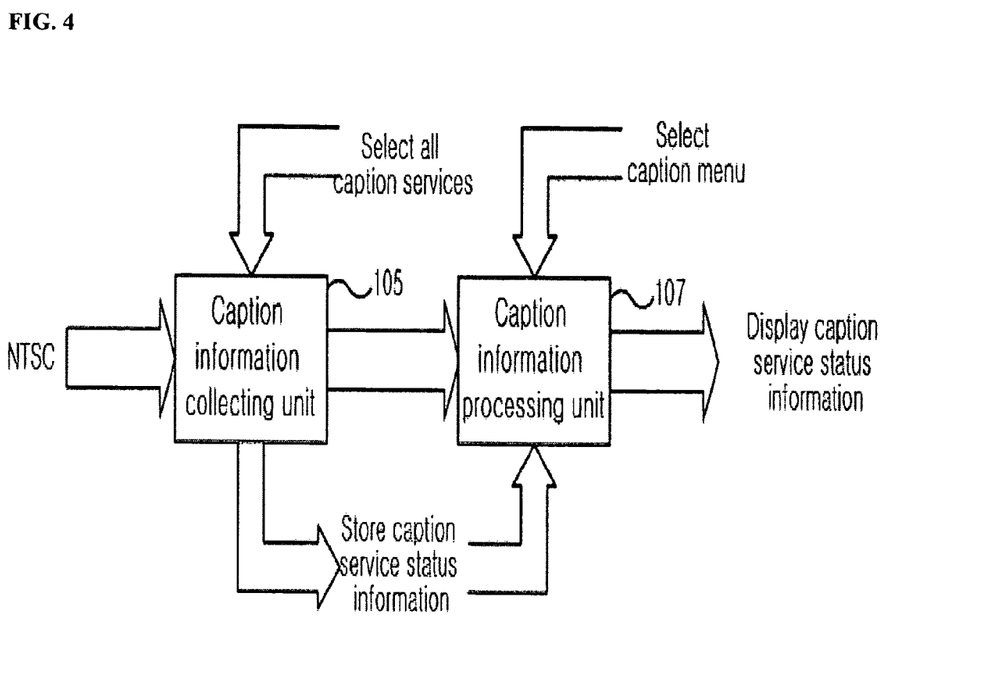
FIG. 4 schematically shows a configuration for processing a caption in an analog television according to an illustrative embodiment of the present invention.

FIG. 4 schematically shows a configuration for processing a caption in an analog television according to an illustrative embodiment of the present invention.

As shown in FIG. 4, when a television is turned on or a channel is changed due to channel selection by a user, the caption information collecting unit 105 determines, for each of the caption services CC1, CC2, CC3 and CC4, whether a caption signal arrives through a NTSC signal, which is an analog broadcast signal input via the broadcast signal input unit.

If it is determined that a caption signal arrives, the caption signal arrival time for each of the caption services is checked and a predetermined caption signal being received is detected to generate a relevant character signal and store the generated character signal as a relevant caption service status information in the memory unit 106.

The caption information collecting unit 105 continues to collect the caption service status information of the broadcast signal that is input at a predetermined time interval, and update the caption service status information stored in the memory 106.

During this process, if the user selects a caption menu from OSD menus, the control unit detects caption service status information stored in the memory unit in response to the selection of the caption menu by the user and transmits the detected status information to the caption information processing unit 107.

The caption information processing unit 107 displays the received caption service status information as an OSD menu in a predetermined layout structure.

Figure 5:
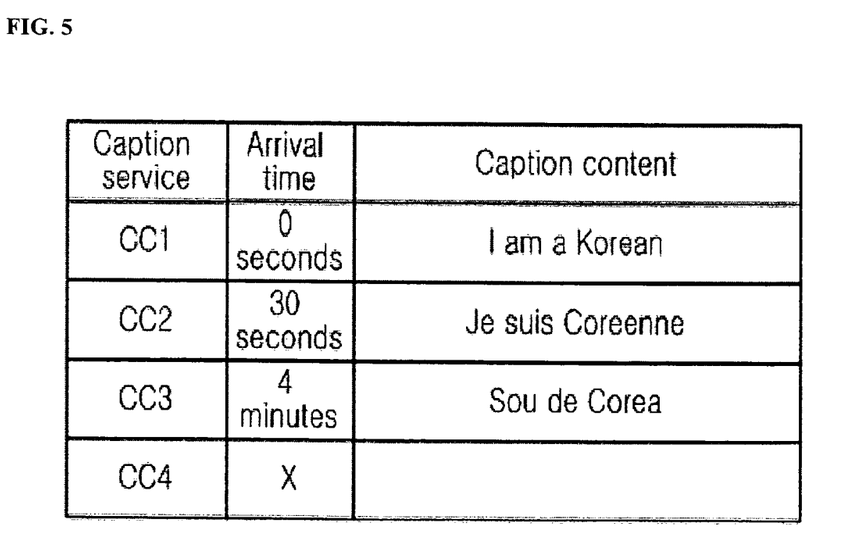
FIG. 5 shows information on the status of a caption service for an analog broadcast signal displayed on a television screen according to an illustrative embodiment of the present invention.

Assume that caption service status information for the caption services CC1, CC2 and CC3 includes caption signal arrival times of '0 seconds', '30 seconds' and '4 minutes', and caption content decoded into character signals of 'I am a Korean', 'Je suis Coreenne' and 'Sou de Corea', respectively, whereas the caption service CC4 does not have an arrived caption signal.

In this case, if the layout structure for displaying the caption service status information is set as a table, the caption service status information is displayed on a television screen to be shown to the user in a structured manner, for example, as shown in FIG. 5.

Figure 6:
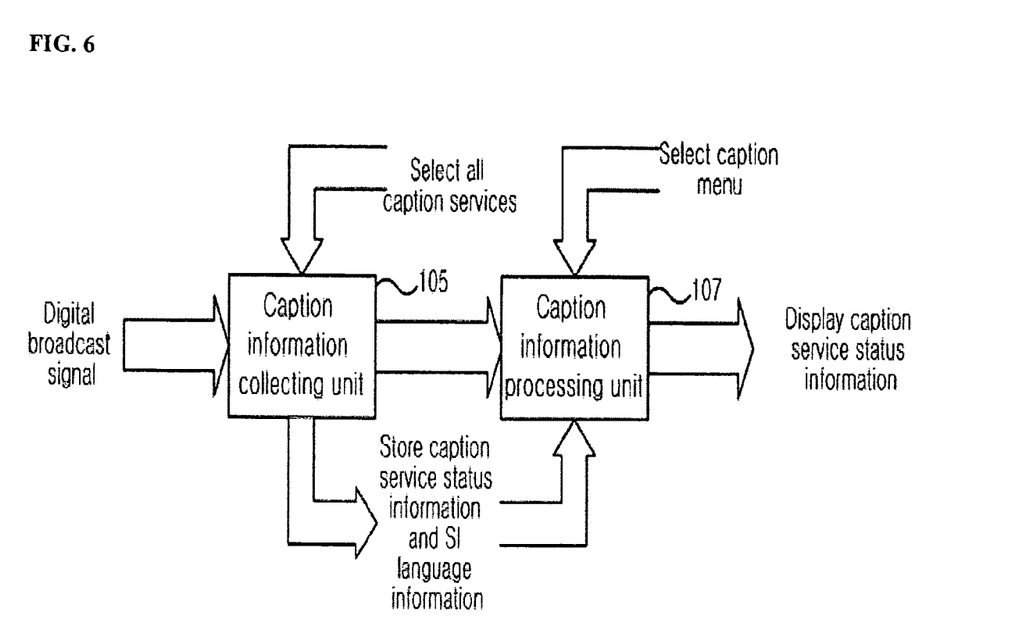
FIG. 6 schematically shows a configuration for processing a caption in an analog/digital television according to an illustrative embodiment of the present invention.

FIG. 6 schematically shows a configuration for processing a caption in an analog/digital television according to an illustrative embodiment of the present invention.

As shown in FIG. 6, when a television is turned on or a channel is changed due to channel selection by a user, the caption information collecting unit 105 determines whether the selected channel is an analog broadcast channel or a digital broadcast channel.

If it is determined that an analog broadcast signal is selected, the caption signal processing procedure for the caption signal of the analog broadcast signal described above is performed.

If it is determined that a digital broadcast signal is selected, it is then determined, for each of the caption services SERVICE 1, SERVICE 2, SERVICE 3, SERVICE 4, SERVICE 5 and SERVICE 6, whether a caption signal arrives through the digital broadcast signal that is input into the broadcast signal input unit 103.

If it is determined that a caption signal arrives, the caption signal arrival time of each caption service is checked and a predetermined caption signal being received is detected to generate a relevant character signal.

Additionally, SI language information for each caption service, which is obtained from SI provided together with the digital broadcast signal, is detected and then stored in the memory unit 106 as the caption service status information for each caption service.

The caption information collecting unit 105 continues to collect the caption service status information of the broadcast signal, which is input at a predetermined time interval, and update the caption service status information stored in the memory unit 106.

During this process, when the user selects a caption menu from OSD menus, the control unit detects caption service status information stored in the memory unit 106 in response to the selection of the caption menu by the user and transmits the detected information to the caption information processing unit 107.

The caption information processing unit 107 displays the caption service status information as an OSD menu in a predetermined layout structure.

Figure 7:
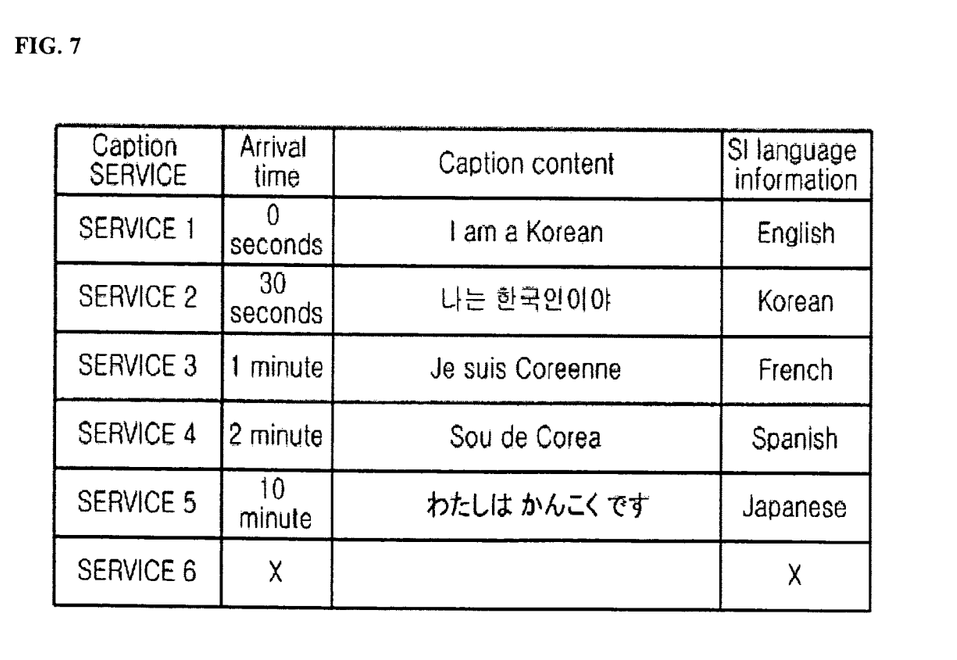
FIG. 7 shows information on the status of a caption service for an analog/digital broadcast signal displayed on a television screen according to an illustrative embodiment of the present invention.

Assume that caption service status information for the caption services SERVICE 1, SERVICE 2, SERVICE 3, SERVICE 4 and SERVICE 5 includes caption arrival times of '0 seconds', '30 seconds', '1 minute', '2 minutes' and '10 minutes'; caption content decoded into character signals of 'I am a Korean', '나는 한국인이야', 'Je suis Coreenne', 'Sou de Corea' and 'わたしは かんこくです'; and SI language information of 'English', 'Korean', 'French', 'Spanish' and 'Japanese', respectively, whereas the caption service SERVICE 6 does not have an arrived caption signal.

In this case, if the layout structure for displaying the caption service status information is set as a table, the caption service status information is displayed on a television screen to be shown to the user in a structured manner for example, as shown in FIG. 7.

According to the present invention constructed as above, caption service status information can be effectively provided depending on a user's selection by checking the status of a caption service for a broadcast signal at a predetermined time interval and storing the caption service status information obtained through the check.

Additionally, there is an advantage in that the signal arrival time and caption content for each caption service are displayed in a structured manner, so that the user conveniently confirms and uses such caption service status information that is available from an existing broadcast signal.

The present invention described above is not limited to the illustrated embodiments and accompanying drawings since those skilled in the art can make various substitutions, changes and modifications thereto without departing from the technical spirit and scope of the invention.

What is claimed is:

1. An apparatus for providing caption information, comprising:
   a caption information collecting unit for checking the status of a plurality of caption services, which are provided with a broadcast signal, and collecting caption service status information on the status of the plurality of caption services; and a caption information processing unit for displaying the caption service status information for the plurality of caption services on a display unit;

wherein information for a plurality of caption services are provided in a single layout, including the status information for each caption service and content of each caption service.

2. The apparatus as claimed in claim 1, wherein the caption information collecting unit stores the caption service status information in a memory unit.

3. The apparatus as claimed in claim 2, wherein if a power of the display unit is turned on to an active channel or if a specific channel is selected by a user, the caption information collecting unit updates the caption service status information by collecting current caption service status information for the plurality of caption services through a broadcast signal over the active or selected channel after deleting the caption service status information stored in the memory unit, and stores the current caption service status information in the memory unit.

4. The apparatus as claimed in claim 1, wherein the caption service status information further includes system information (SI) language information for each of the plurality of caption services that are provided with the broadcast signal.

5. The apparatus as claimed in claim 1, wherein the caption information processing unit displays the caption service status information as an on screen display (OSD) menu in a predetermined layout structure.

6. The apparatus as claimed in claim 4, wherein the caption information processing unit displays the caption service status information as an on screen display (OSD) menu in a predetermined layout structure.

7. The apparatus as claimed in claim 5, wherein the predetermined layout structure is a table composed of the caption service status information for each of the plurality of caption services, which are provided with the broadcast signal, to provide a user with the caption service status information in a structured manner.

8. The apparatus as claimed in claim 6, wherein the predetermined layout structure is a table composed of the caption service status information for each of the plurality of caption services, which are provided with the broadcast signal, to provide a user with the caption service status information in a structured manner.

9. The apparatus as claimed in claim 1, wherein the caption information processing unit displays the caption service status information as an on screen display in a table showing the caption signal arrival time, the caption content and language information for each of the plurality of caption services.

10. The apparatus as claimed in claim 1, wherein the caption service status information includes a caption signal arrival time and caption content for each of the plurality of caption services that are provided with the broadcast signal.

11. The apparatus of claim 1, wherein the caption information collecting unit is a unit for periodically checking the status of the plurality of caption services.

12. The apparatus of claim 1, wherein the layout is displayed upon receipt of a request by a user.

13. The apparatus of claim 1, wherein the status information includes a caption signal arrival time.

14. A method of providing caption information, comprising:

checking the status of a plurality of caption services that are provided with a broadcast signal and collecting caption service status information on the status of the plurality of caption services; and if a user requests the caption service status information, displaying the caption service status information on a display unit;

wherein information for the plurality of caption services are provided in a single layout, including the status information for each caption service and content of each caption service.

15. The method as claimed in claim 14, further comprising storing the caption service status information in a memory unit.

16. The method as claimed in claim 15, further comprising updating the caption service status information by determining if a power of the display unit is turned on to an active channel or if a specific channel is selected by the user, and if so, collecting current caption service status information for the plurality of caption services through a broadcast signal over the active or selected channel after deleting the caption service status information stored in the memory unit, and storing the current caption service status information in the memory unit.

17. A method of providing caption information, comprising:

checking the status of one or more caption services that are provided with a broadcast signal at a predetermined time interval and collecting caption service status information on the status of the one or more caption services; and if a user requests the caption service status information, displaying the caption service status information on a display unit;

wherein collecting the caption service status information comprises:

determining whether a caption signal corresponding to a predetermined caption service for each of the one or more caption services is received through the broadcast signal during a predetermined time period;

if it is determined that the caption signal is received, checking caption signal arrival time, detecting a predetermined caption signal being received and collecting the caption signal arrival time and caption content for the predetermined caption service from the caption signal; and if it is determined that the caption signal is not received, recording that the predetermined caption service is not provided.

18. The method of claim 17, wherein the status information includes a caption signal arrival time.

19. The method as claimed in claim 14, wherein the caption service status information is displayed in a predetermined layout structure.

20. The method as claimed in claim 19, wherein the predetermined layout structure is a table composed of the caption service status information for each of the plurality caption services to provide the user with the caption service status information in a structured manner.

21. The method as claimed in claim 14, wherein the caption service status information further includes system information (SI) language information for each of the plurality of caption services that are provided with the broadcast signal.

22. The method as claimed in claim 21, wherein the caption service status information is displayed in a predetermined layout structure.

23. The method as claimed in claim 22, wherein the predetermined layout structure is a table composed of the caption service status information for each of the plurality of caption services to provide the user with the caption service status information in a structured manner.

24. The method as claimed in claim 14, wherein the caption service status information includes a caption signal arrival time and caption content.

25. The method of claim 14, wherein checking the status of the plurality of caption services is performed periodically.

26. The method of claim 14, wherein the status information includes a caption signal arrival time.

27. The method as claimed in claim 14, wherein the caption information processing unit displays the caption service status information as an on screen display in a table showing the caption signal arrival time, the caption content and language information for each of the plurality of caption services.

* * * * *